US008443989B2

(12) United States Patent
Walker et al.

(10) Patent No.: US 8,443,989 B2
(45) Date of Patent: May 21, 2013

(54) MEDIA RACK CONFIGURATION

(75) Inventors: James Walker, Wilmer, TX (US); Jeffrey Duke, Murphy, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 128 days.

(21) Appl. No.: 12/625,373

(22) Filed: Nov. 24, 2009

(65) Prior Publication Data

US 2011/0120964 A1    May 26, 2011

(51) Int. Cl.
    *A47F 7/00*         (2006.01)
    *B65H 75/38*       (2006.01)
    *G02B 6/00*        (2006.01)

(52) U.S. Cl.
    USPC .......... 211/85.5; 211/26; 242/388.5; 385/135

(58) Field of Classification Search
    USPC .......... 385/134, 135, 136, 137.53; 242/388.1, 242/388.5; 211/85.5, 26
    See application file for complete search history.

(56) References Cited

U.S. PATENT DOCUMENTS

| | | | | |
|---|---|---|---|---|
| 339,738 A * | 4/1886 | Brooks | 242/129.53 |
| 380,174 A * | 3/1888 | Bowles | 206/391 |
| 406,159 A * | 7/1889 | Blaszkaye | 242/129.51 |
| 417,793 A * | 12/1889 | Richards | 242/388.1 |
| 462,702 A * | 11/1891 | Haas | 242/129.62 |
| 470,328 A * | 3/1892 | Harlow | 242/139 |
| 1,508,105 A * | 9/1924 | Kamla | 225/38 |
| 2,147,216 A * | 2/1939 | Raasch | 242/129.6 |
| 2,380,117 A * | 7/1945 | Maldonado | 242/139 |
| 2,892,598 A * | 6/1959 | Dudley | 242/602.2 |
| 2,944,761 A * | 7/1960 | Best | 242/139 |
| 3,360,137 A * | 12/1967 | Novales | 211/175 |
| 3,822,834 A * | 7/1974 | Fjarlie | 242/388.5 |
| 4,502,801 A * | 3/1985 | Hefti et al. | 400/208 |
| 4,552,433 A * | 11/1985 | Titchmarsh et al. | 385/107 |
| 5,255,866 A * | 10/1993 | Campolo | 242/388.1 |
| 5,727,699 A * | 3/1998 | Gilcrease | 211/113 |
| 5,913,485 A * | 6/1999 | Bruffett | 242/139 |
| 5,946,788 A * | 9/1999 | Griffioen et al. | 29/433 |
| 6,014,713 A * | 1/2000 | Agnew et al. | 710/1 |
| D427,829 S * | 7/2000 | Fleming | D6/523 |
| 6,341,187 B1 * | 1/2002 | Wu et al. | 385/52 |
| 6,511,009 B1 * | 1/2003 | Harrison et al. | 242/388.5 |
| 6,580,866 B2 * | 6/2003 | Daud et al. | 385/135 |
| 6,584,267 B1 * | 6/2003 | Caveney et al. | 385/134 |
| 6,594,434 B1 * | 7/2003 | Davidson et al. | 385/135 |
| 6,634,585 B1 * | 10/2003 | Ingram, III | 242/131.1 |
| 7,072,560 B1 * | 7/2006 | Bramson | 385/135 |
| 7,076,144 B2 * | 7/2006 | Loder et al. | 385/134 |
| 7,200,315 B2 * | 4/2007 | Aziz et al. | 385/135 |
| 7,229,042 B2 * | 6/2007 | Thebault et al. | 242/388.1 |
| 2005/0226574 A1 * | 10/2005 | Walker et al. | 385/120 |
| 2006/0049294 A1 * | 3/2006 | Thebault et al. | 242/388.1 |
| 2006/0115228 A1 * | 6/2006 | Iffergan | 385/136 |

(Continued)

*Primary Examiner* — Joshua J Michener
*Assistant Examiner* — Devin Barnett

(57) ABSTRACT

A media rack system is disclosed that generally includes a rack configured to receive a plurality of components that are selectively connected via a plurality of media, e.g., optical fibers or any other wired communication link. An exemplary system may further include one or more media loop retention housings, which include a spool configured to selectively support one of the media, and a media loop retainer defined by the spool. The media loop retainer includes a predetermined radius for selectively retaining a loop of the media. The predetermined radius is greater than or equal to a minimum bend radius associated with the fiber.

14 Claims, 7 Drawing Sheets

U.S. PATENT DOCUMENTS

| | | | |
|---|---|---|---|
| 2006/0239628 A1* | 10/2006 | Weinert et al. | 385/135 |
| 2007/0201793 A1* | 8/2007 | Askins et al. | 385/37 |
| 2008/0197230 A1* | 8/2008 | Namba | 242/579 |
| 2008/0232759 A1* | 9/2008 | Welnert et al. | 385/137 |
| 2011/0064371 A1* | 3/2011 | Leatherman et al. | 385/134 |
| 2011/0121529 A1* | 5/2011 | Cabassa | 280/47.35 |

* cited by examiner

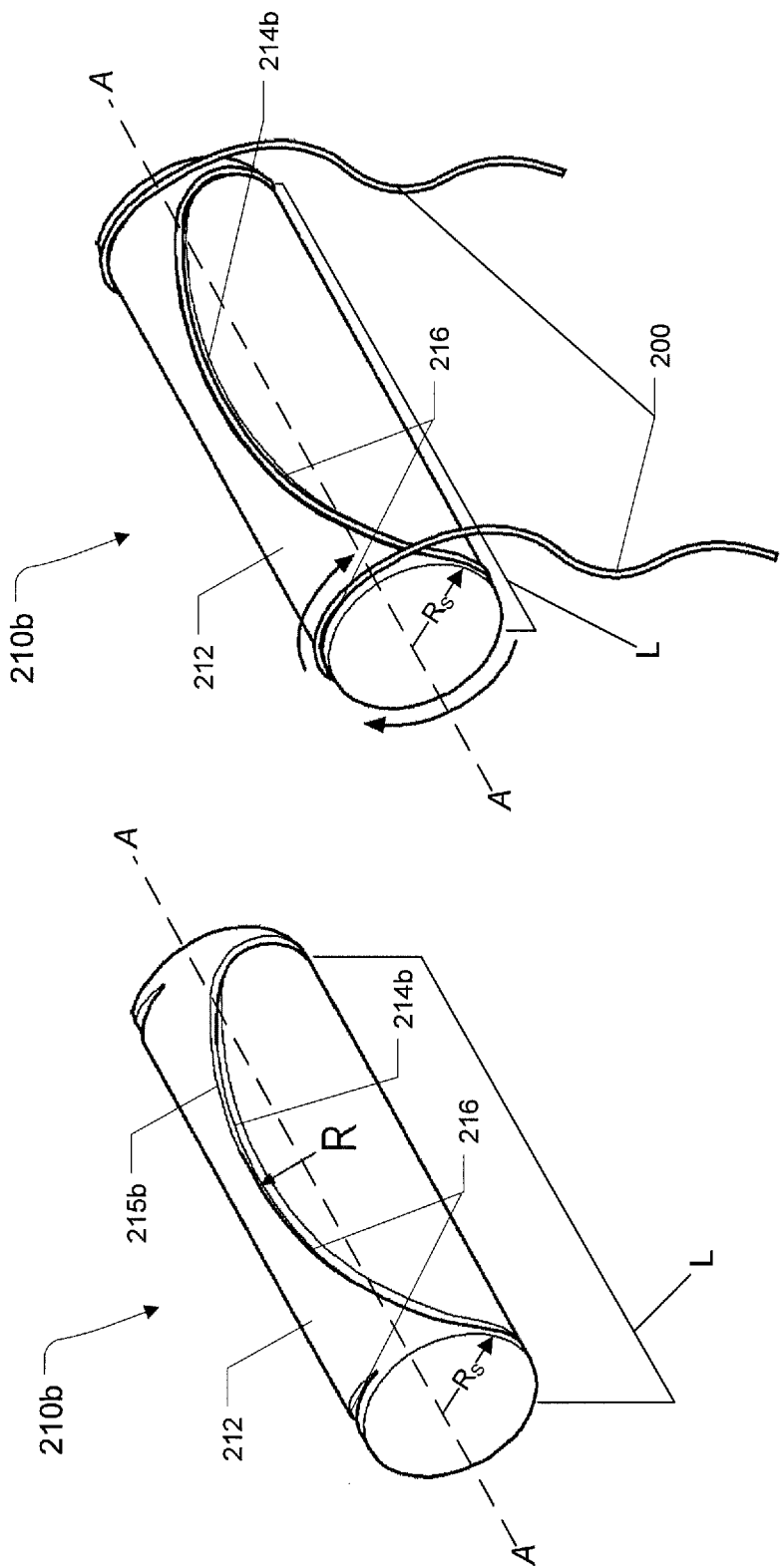

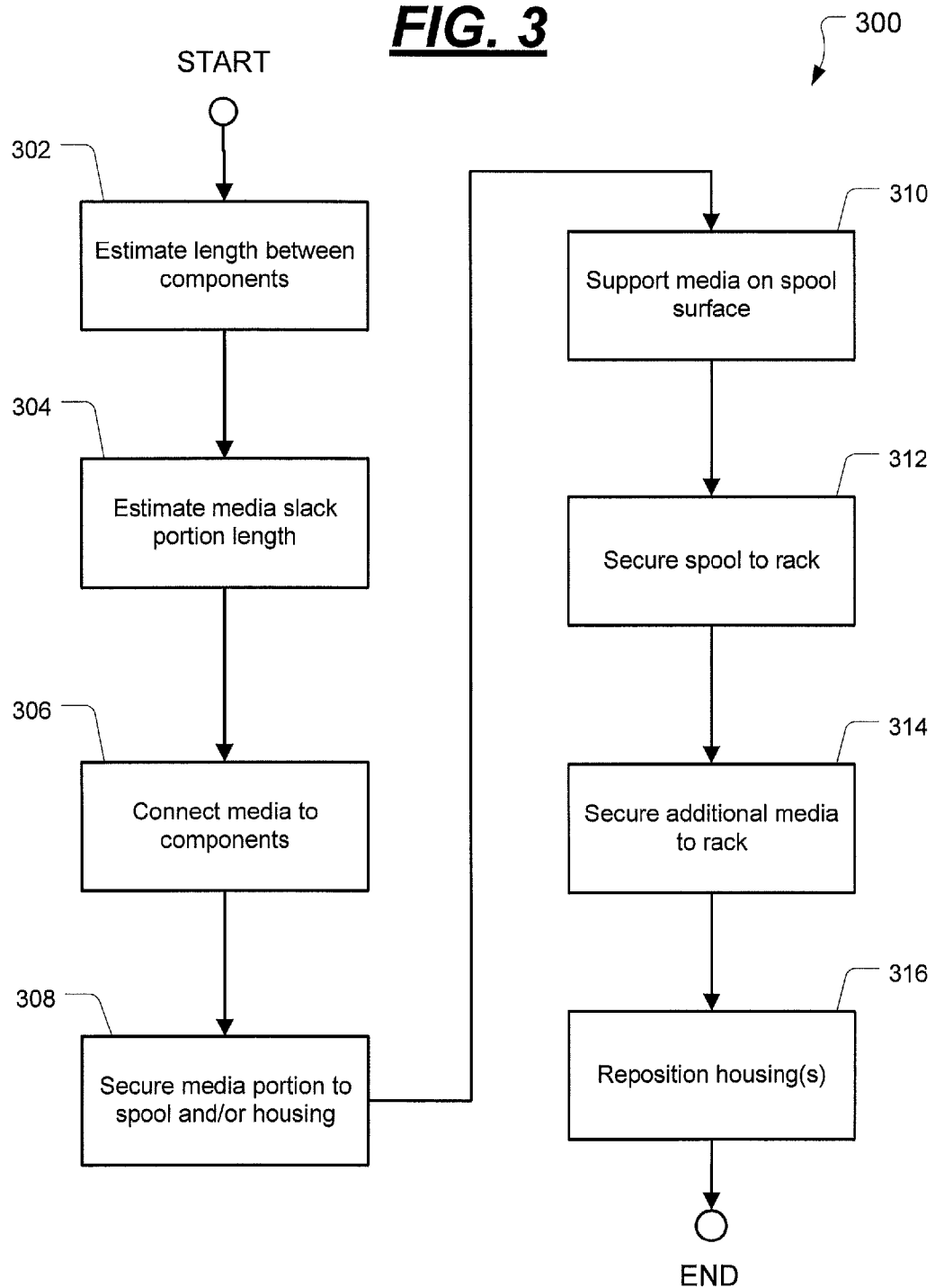

MEDIA RACK CONFIGURATION

BACKGROUND

Fiber optic communication employs light to transmit data between electronic devices using optical fibers. Each optical fiber has a reflective inner surface that reflects the light along a length of the fiber. Fiber optic devices used in fiber optic communication may include an optical interface that transmits and/or receives fiber optic signals. The optical fibers are physically connected to the optical interface, and light is transmitted and/or received at each of the optical interfaces.

Optical fibers that are damaged generally suffer deterioration in transmission capacity and/or quality as a result of the reduced capability of the fiber to reflect light within the fiber. Accordingly, optical fibers must be protected from being bent, pinched, cut, or otherwise damaged in any way that would impair the transmission capability of the fiber. Additionally, the interface between a fiber and other components, e.g., the end of a fiber where it is secured to a connector, must be carefully managed to minimize signal transmission losses across the interface. For example, fibers may generally be cut only with specialized equipment that leaves the cut fiber with a smooth end that is properly aligned and prepared to minimize any transmission loss from the fiber to an adjacent connector or component. The specialized equipment and/or personnel required for splicing optical fibers for may not be readily available in each facility.

Accordingly, it may be difficult to cut fibers to an exact length between components, and communication facilities must therefore stock a wide variety of fiber lengths. The fibers may in some cases be connected to components with relatively large amounts of excess slack that is left unprotected and may be wrapped around portions of the racks. However, this causes great difficulty in repositioning or removing fibers any time there is a large number of fibers connected to the same rack or component, as the fibers become wrapped upon one another or tangled, thereby preventing removal or adjustment of any individual fiber. This is especially problematic in central office environments that transmit large numbers of communication signals to/from the facility and between components located within the facility, and necessarily use a large number of fibers in relatively confined spaces.

Accordingly, a communication component rack system is needed that provides greater protection and installation flexibility for fibers connected to one or more racks.

BRIEF DESCRIPTION OF THE DRAWINGS

FIG. 2D illustrates an exemplary spool for a media loop housing without any fiber secured thereto;

FIG. 2E illustrates the spool of FIG. 2D with a media secured to the spool; and

FIG. 3 illustrates an exemplary process for securing a media to a rack.

DETAILED DESCRIPTION

Figure 1A:
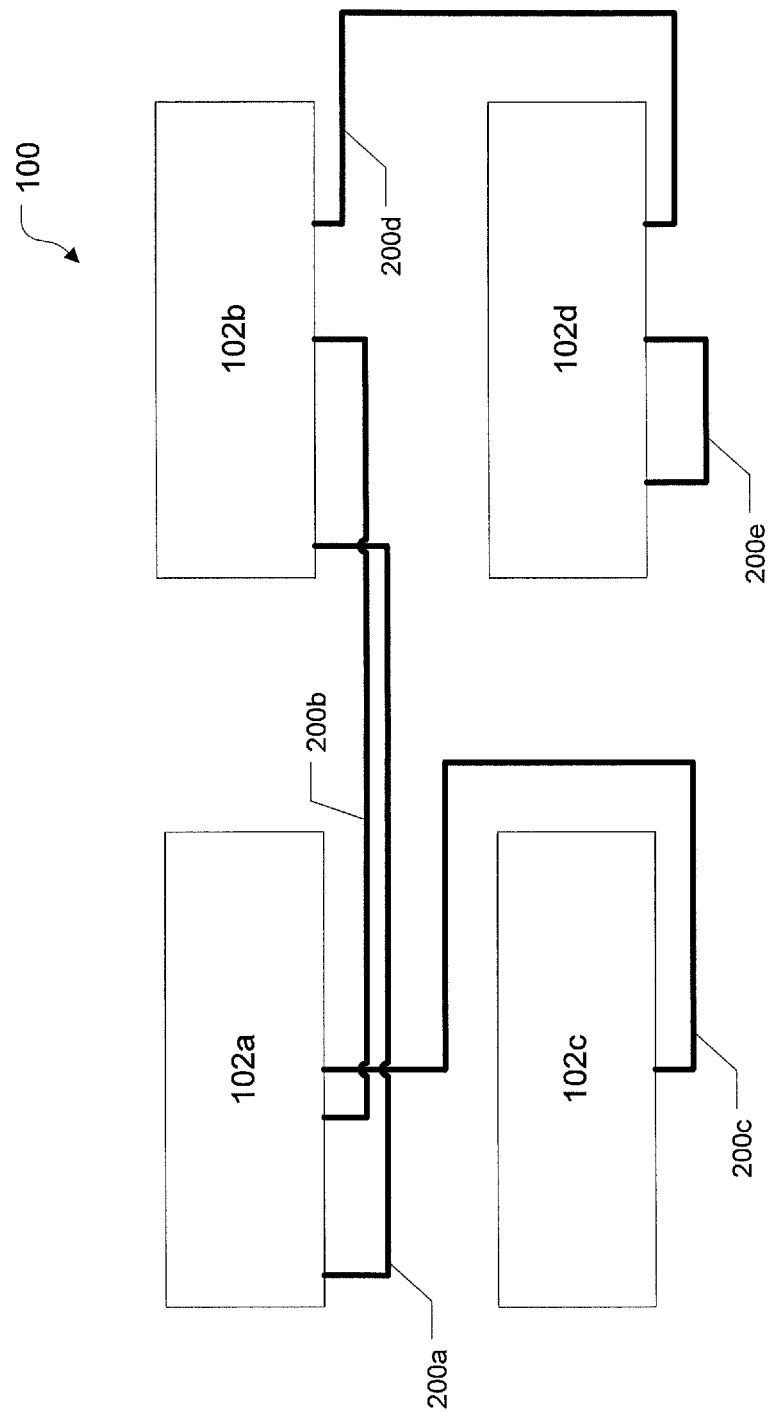
FIG. 1A is a schematic illustration of an exemplary communication facility.

Referring now to the discussion that follows and also to the drawings, illustrative approaches to the disclosed apparatuses and methods are shown in detail. Although the drawings represent some possible approaches, the drawings are not necessarily to scale and certain features may be exaggerated, removed, or partially sectioned to better illustrate and explain the disclosed device. Further, the descriptions set forth herein are not intended to be exhaustive or otherwise limit or restrict the claims to the precise forms and configurations shown in the drawings and disclosed in the following detailed description.

Various examples of a media racking system and methods for connecting communication-based media are disclosed. While the exemplary systems and methods are described herein generally in the context of optical fiber communication systems, virtually any type of communication-based media may be employed as an alternative or in addition to fiber optic cables in an exemplary rack or method of connecting the media. Examples of such media include, but are not limited to, coaxial cables, wires, strands, or the like.

An exemplary media racking system may generally include a rack configured to receive a plurality of components that are selectively connected via a plurality of communication-based media, e.g., optical fibers, coaxial cables, wires, ribbons, strands, or any other wired communication link. An exemplary system may further include one or more media retention housings, which include a spool configured to selectively support one of the media, and a media loop retainer defined by the spool. The media loop retainer includes a predetermined radius for selectively retaining a loop of the media. The predetermined radius may be greater than or equal to a minimum bend radius associated with the media, thereby generally preventing the media from being bent at a radius smaller than the minimum bend radius of the media.

An exemplary method may include securing a portion of a communication-based media, e.g., an optical fiber, to a spool, and establishing the portion of the media with a predetermined radius that is greater than or equal to a minimum bend radius of the media. The method may further include supporting the media at least partially on a support surface of the spool.

Figure 1B:
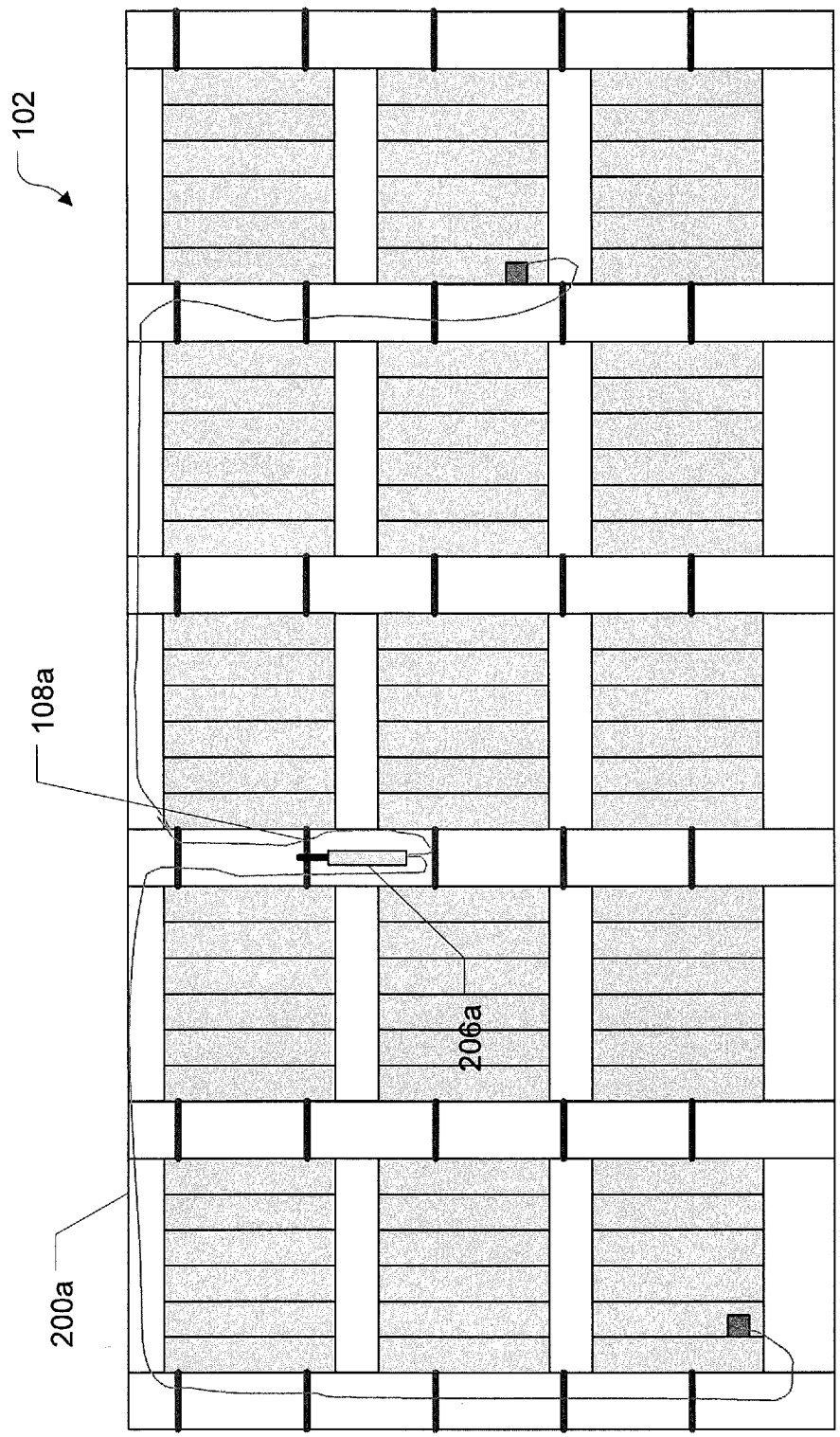
FIG. 1B illustrates an exemplary media rack used in the communication facility of FIG. 1A.
Figure 1C:
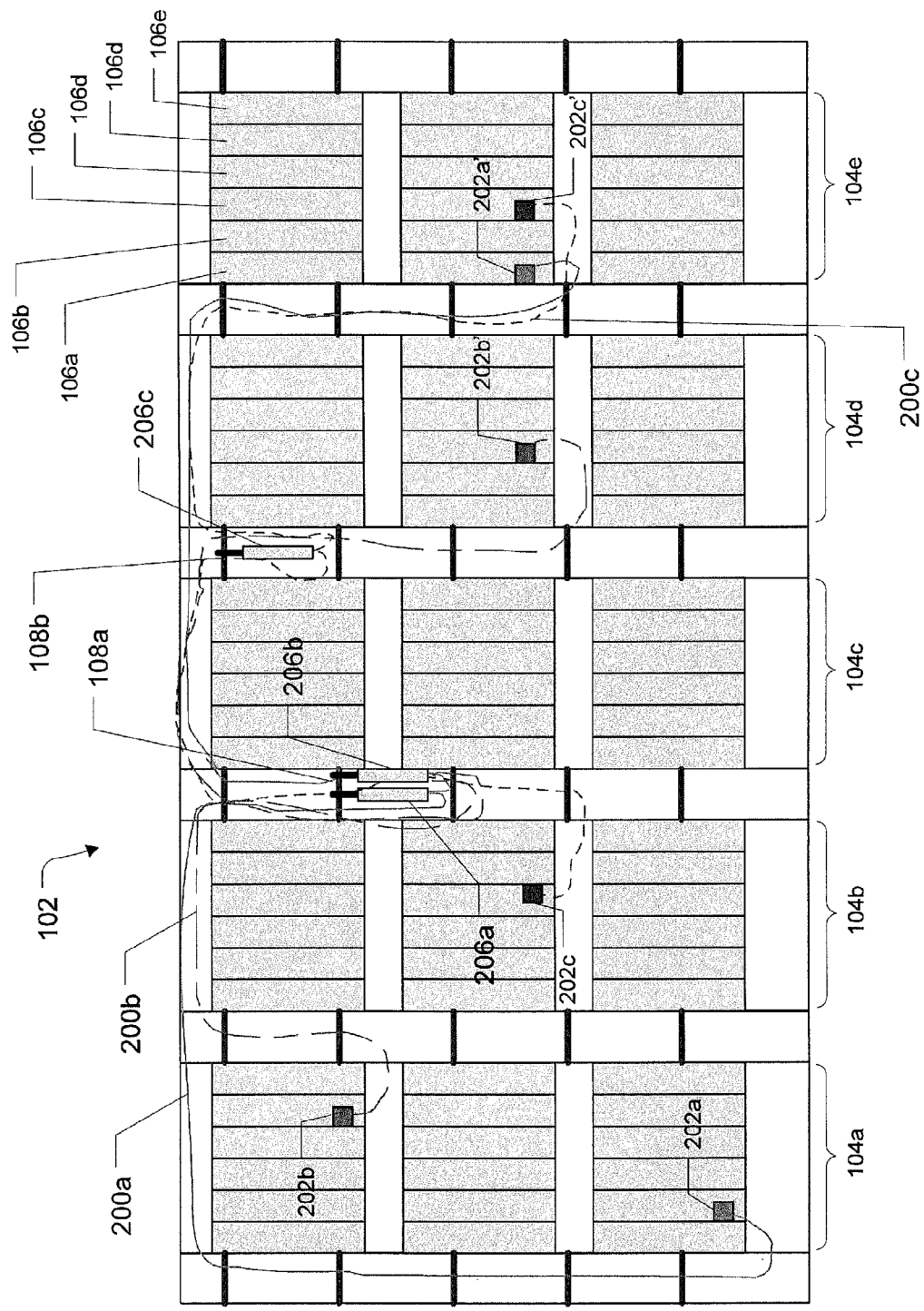
FIG. 1C illustrates the media rack of FIG. 1B with additional media installed to the rack.

Turning now to FIGS. 1A-1C, an exemplary communication facility 100 is illustrated schematically. The communication facility 100 may generally include a plurality of racks 102a, 102b, 102c, and 102d (collectively, 102). The racks 102 each generally house components that are connected to each other via a plurality of communication-based media or lines 200. In one exemplary illustration, these media may be optical fibers. As best seen in FIG. 1A, the media 200 may connect components to each other that are positioned in a same rack 102, or in different racks 102. While FIG. 1A illustrates five lines or media 200 that are connected between components positioned in four racks 102, at any given time a very large number of media 200 may be routed between components positioned in the racks 102, between the racks 102, and between the communication facility 100 and other components or equipment (not shown) associated with a communication system. In fact, each rack may have a large number of components and media 200 at any given time. Accordingly, there is no numerical or geographic limitation on the number of media 200 or racks 102 that may be present in the communication facility 100.

Turning now to FIGS. 1B and 1C, an exemplary rack 102 is described in further detail. As described above, each rack 102 may generally include a plurality of components, e.g., communication components, which are connected to other components by way of one or more of the media 200. Each rack 102 may include a plurality of bays 104, each of which define one or more shelves 106. Each of the shelves 106 may include one or more components to which media 200 are connected to allow transmission of signals, e.g., optical signals, between the components.

The racks 102 also may include spacing posts 108 between bays 104. The spacing posts 108 generally space apart the bays 104 and provide mounting points for media slack or loops, as will be described further below. For example, FIGS. 1B and 1C illustrate media loop housings 206 that generally provide storage and/or protection for portions of the media 200, e.g., in loops. Further, the spacing posts 108 may be oriented to allow the securement of more than one housing 206 to each of the spacing posts 108. For example, as best seen in FIG. 1C, the spacing posts 108 are oriented generally perpendicular to a longitudinal length of the rack 102, allowing multiple housings 206 to be hung from a single spacing post 108. Accordingly, slack portions of different media 200 may be positioned on a same spacing post 108, as may be convenient where the media 200 lead to components that are each located near the spacing post 108.

Turning now to FIGS. 2A-2E, an exemplary media loop housing 206 is shown in further detail. Media loop housing 206 may generally include a spool 210a, 210b (collectively, 210) that may generally be rotatable to allow selective retraction and extension of one of the media 200 from the media loop housing 206. The spool may include a support surface 212 and a media loop retainer 214a, 214b (collectively, 214) that allows selective securement of the media 200 to the spool 210 for retraction into and extension from the housing 206. The spool 210 may be rotatable in any way that is convenient. For example, spool 210 may be generally retractable by way of a spring or other biasing mechanism that tends to rotate the spool 210 to retract the media 200 within the media loop housing 206. Alternatively, a hand crank or grip (not shown) may be provided that allows for a user to turn the spool 210 manually to retract or extend the media 200.

Figure 2A:
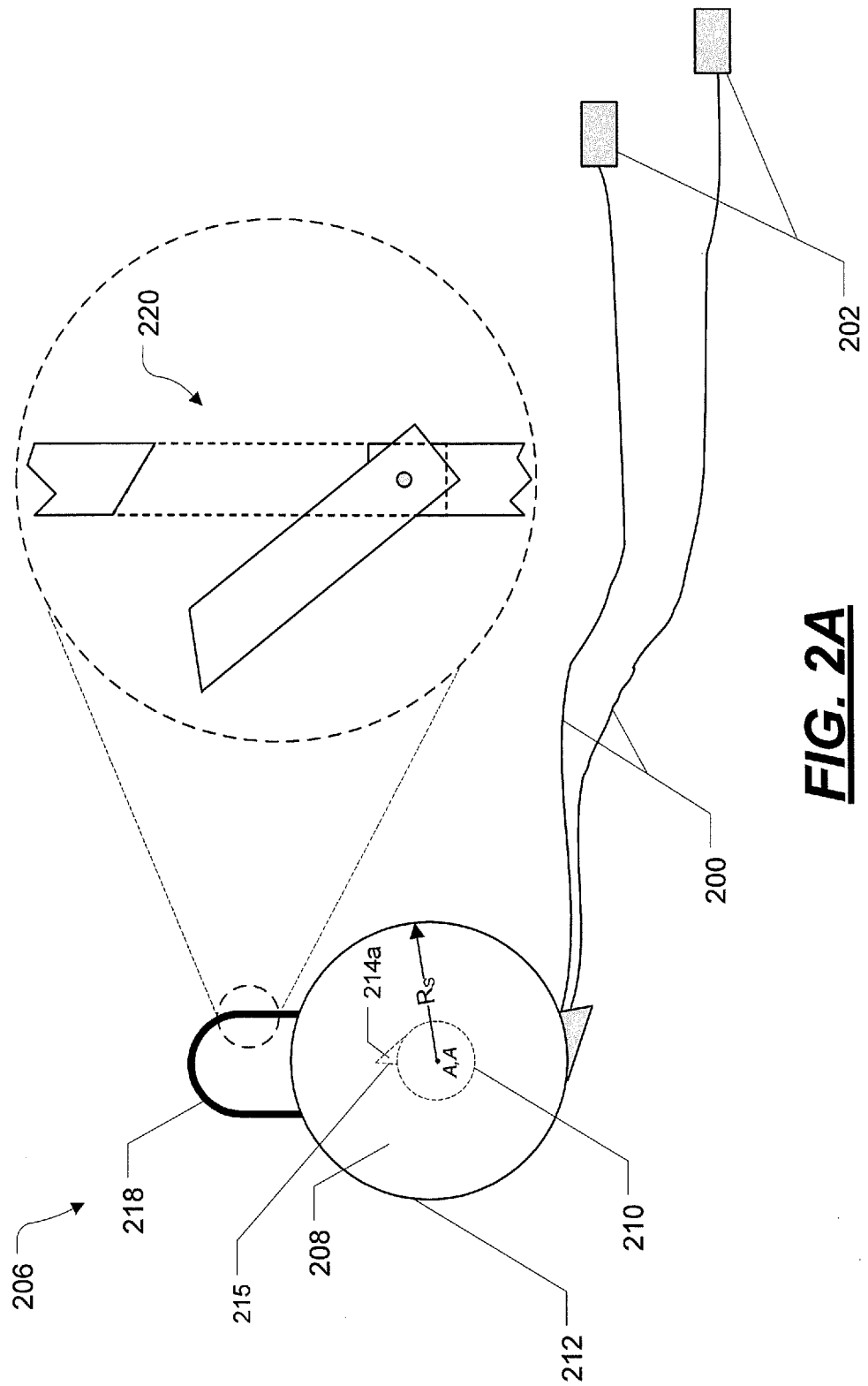
FIG. 2A illustrates an exemplary media loop housing.
Figure 2C:
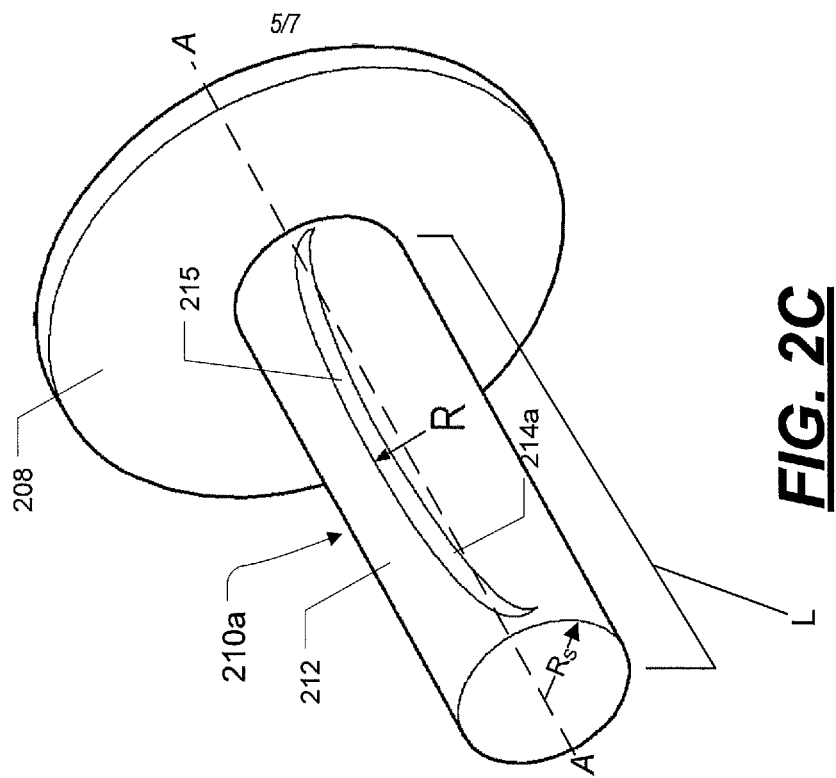
FIG. 2C illustrates the spool of FIG. 2B without the media shown in FIG. 2B.
Figure 2B:
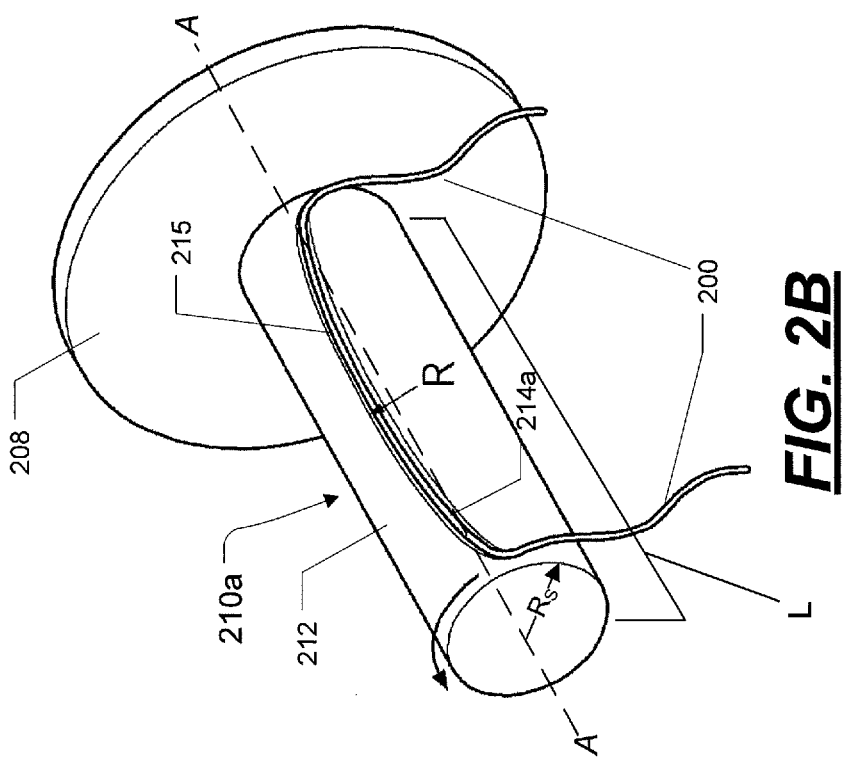
FIG. 2B illustrates an exemplary spool for a media loop housing with a media secured to the spool.

Spool 210a, as best seen in FIGS. 2B and 2C, may generally include a loop support surface 212 and a media loop retainer 214a. The media loop retainer 214a allows selective attachment of a portion or loop of the media 200 to the spool 210a to allow the spool 210a to retract the media 200 within the housing 206. As best seen in FIGS. 2A and 2C, the media loop retainer 214a generally defines an abutment surface 215 that extends radially away from the spool surface 212. In other words, the media loop retainer 214a generally defines a curved wall extending radially away from the media support surface 212 toward the outside of the housing 206. The abutment surface 215 thus provides a surface that is generally perpendicular to the direction that the loop of the media 200 is pulled into the loop housing 206. Accordingly, a portion of the media 200 may be laid around the media loop retainer 214, and the abutment surface 215 generally "pulls" the loop of the media 200 into the housing 206 when the spool 210a is rotated. As best seen in FIG. 2B, the media loop retainer 214 generally defines a minimum radius R along the abutment surface 215. The abutment surface 215 thus defines a predetermined radius R that is no smaller than a minimum bend radius associated with the media 200.

Accordingly, the media 200 may be secured to the spool 210a without crimping, pinching or otherwise bending the media 200 in a way that would hinder transmission of a signal through the media 200. A portion of the media 200, e.g., a slack portion that represents extra media not necessary to reach between components to which the media 200 is connected, may thus be selectively placed on the media loop retainer 214 and retracted within the media loop housing 206. The housing 206 thereby generally protects the media 200 from damage that may hinder signal transmission.

Turning now to FIGS. 2D and 2E, another exemplary spool 210b is illustrated. The media loop retainer 214b generally includes a cavity 216 that is depressed below the support surface 212 of the spool 210b, i.e., extending radially away from the support surface 212 toward the axis A-A of the spool 210b. The cavity 216 thus defines an abutment surface 215b within the cavity 216, around which a portion or loop of the media 200 may be placed. Furthermore, as best shown in FIG. 2D, the cavity 216 may extend around a substantial portion of the circumference of the spool 210b, thereby generally providing a guide for the media 200 that generally guides the media 200 to a position adjacent the opposing ends of the spool 210b. Furthermore, side panels 208 (not shown in FIGS. 2D and 2E), which may be secured to the opposing ends of the spool 210b, generally provide a lateral abutment surface for the media 200, such that the media 200 will lay upon itself as it is wrapped around the spool 210b. The media 200 thus may be supported by the spool surface 212 and/or refracted within the housing 206 by turning the spool 210b, taking up any excess slack of the media 200 and protecting the media 200 from pinching, crimping, bending, or any other damage that could hinder transmission of an optical signal through the media 200.

Exemplary media loop retainers 214 may extend axially with respect to a spool 210 along substantially an entire length L of a given spool 210, thereby maximizing the predetermined radius R of the media loop retainer 214 relative to the axial length L of the spool 210. Accordingly, larger minimum bend radii of media 200 may be accommodated by the spool 210 while also minimizing the overall size of the spool 210 and/or housing 206. In one exemplary illustration, it may be advantageous to minimize an overall axial length L of the spool 210 in order to allow the greatest flexibility for mounting multiple housings 206 to a rack 102, e.g., to fit a larger number of housings 206 in a given space. At the same time, it may also be desirable to maximize the number of different media 200 that may be used with a given housing 206 based upon the minimum bend radii associated with the media 200, and therefore the predetermined radius R in these examples may need to be maximized. Generally, in order to allow a maximum predetermined radius R while also minimizing the overall axial length L for a given spool 210, the axial length L of the spool 210 may be as little as twice the largest minimum bend radius of media 200 for which the spool 210 is intended to be used. For example, as best seen in FIGS. 2C and 2D, where the spool radius $R_S$ is no smaller than the minimum bend radius associated with the media 200, and thus is no smaller than the predetermined radius R of the spool 210, the axial length L may be as small as two times the predetermined radius R.

Additionally, the spool 210 itself may define a spool radius $R_S$ that is less than or equal to a minimum bend radius associated with the media 200. The media loop retainer 214 and, e.g., a corresponding abutment surface 215 or cavity 216 as described above, thus may define a curve by generally following a generally cylindrical shape of the spool surface 212, e.g., as best seen in FIG. 2A. Further, as described above the media loop retainer 214 curves with respect to the spool surface 212, e.g., as best seen in FIGS. 2C and 2D, thereby defining a generally curved guide with respect to the spool surface 212 that extends from a generally central portion of the spool 212 to a position adjacent each opposing end of the spool 210. An overall shape or curve of the media loop retainer 214 is therefore defined in part by a generally cylindrical shape of the spool 210, and also a curve of the media loop retainer with respect to the support surface 212.

Referring again to FIG. 2A, the media loop housing 206 also may include a mounting mechanism 218. The mounting mechanism 218 may include a loop or hook that generally allows the housing 206 to be selectively secured to a spacing post 108 of the rack 102. For example, as best seen in FIGS. 1B and 1C, each media loop housing 206 is secured to a spacing post 108. The media loop housings 206 may be positioned on any spacing post 108 where it is most convenient, e.g., where it is most convenient to position slack of the media 200 that is looped and retracted within the housing 206. Furthermore, the housings 206 may each easily be repositioned as may be convenient when connecting, disconnecting and/or reconnecting media 200 to the racks 102.

The spools 210 advantageously allow the media 200 to be selectively secured to the spool 210 at any point along the length of the media 200. Accordingly, a housing 206 may be repositioned at different points along the length of the media 200, and further may allow the media 200 to remain connected to components and/or racks 102 to which the media 200 is connected while the housing 206 is repositioned. For example, a media 200 may be fully extended and removed from a housing 206, and the media may be secured to the media loop retainer 214 at a different point along the length of the media 200, allowing the housing 206, and any slack in the media 200, to be repositioned with respect to the media 200. The selective repositioning of the housings 206 allows media 200 to generally remain connected while other adjacent media 200 are removed or repositioned, e.g., due to repair or replacement.

Proceeding now to FIG. 3, an exemplary process for retracting a media 200 associated with communication components is described. Process 300 may begin at block 302, where a media length between components that are desired to be connected is estimated, e.g., a length of an optical fiber extending between the components. This media length may include an estimated distance between racks 102 that house the respective components that are to be connected, e.g., any distance that the media must be travel between the racks 102. Additionally, a media length may be determined from a maximum distance, e.g., length and/or height, associated with a rack 102 that houses one of the connected components. Process 300 may then proceed to block 304. In block 304, a slack portion associated with the connection of the media 200 in block 302 may be estimated. For example, slack may generally be desired to allow for errors in locations of components connected via media 200, repositioning of a component to which the media 200 is connected within the rack 102, or to an entirely different rack 102. The slack portion of a media 200 may thus include an estimate of an error in distance estimates between components connected via media 200, or of any other distance that a given component connected to the media 200 may need to be moved at any given time during operation. The slack may in some embodiments be very little or close to zero, e.g., where the estimated distance(s) required for a given media 200 are expected to be no greater than the initial measured distances between the components connected by the media 200. The slack estimated in block 304 may be used in conjunction with the length determination in block 302 to determine a desired media length for connecting two components together. Process 300 may then proceed to block 306.

In block 306, each end of the media 200 may be connected to a communication component. The components may include any network equipment that communicates via media 200, e.g., optical circuits or Ethernet circuits, merely as examples. As described above, the components connected by the media 200 may be in a same one of the racks 102, or may be positioned in two different racks 102. Process 300 may then proceed to block 308.

In block 308, a portion of the media 200 is secured to a spool 210 and/or housing 206. For example, as described above, a loop of the media 200 may be secured to a fiber loop retainer 214 that is provided on a spool 210 of the fiber loop housing 206. The portion of the media 200 that is secured to the spool 210, e.g., a loop of the media 200, may be secured to an abutment surface 215 of the spool 210, where the abutment surface defines a predetermined radius R that maintains a minimum bend radius associated with the media 200. The predetermined radius generally prevents pinching or bending of the media 200 that would impair the ability of the media 200 to transmit signals, e.g., optical communications, through the portion of the media 200 that is secured to the spool 210. Additionally, as described above the spool 210 may define a cavity, e.g., cavity 216, which guides the media 200 from a generally central portion of the spool 210 toward opposing outer edges of the spool 210. The cavity 216 may thereby position each end of the media 200 at the outer edges of the spool 210, thereby allowing the media 200 to wrap around the spool 210 and toward the center portion of the spool 210.

The spool 210, as described above, may be positioned along the media 200 at any position along the media 200 where it is convenient to secure the media 200 to the spool. For example, it may be convenient to position the spool 210 and/or housing 206 near a component to which the media 200 is connected. Alternatively, it may be convenient to position the spool 210 and/or housing 206 on a rack 102 where there is adequate space to locate the spool 210 and/or housing 206. For example, a housing 206 and/or spool 210 may be selectively secured to a spacing post 108 or other feature of a rack 102 having space to accommodate the spool 210.

Proceeding to block 310, the media 200 be supported by the spool surface 212, e.g., by retracting the media 200 at least partially onto the spool 210 and/or within the housing 206. For example, as described above, the spool 210 may be rotated, e.g., by a self-retracting mechanism or crank, thereby retracting a slack portion of the media 200 within the housing 206 such that at least a portion of the media 200 sits upon the spool surface 212. Accordingly, a portion of the media 200 that is retracted within the housing 206 may generally be equal to the slack portion determined in block 304. Process 300 may then proceed to block 312. Process 300 may then proceed to block 312.

In block 312, the spool 210 and/or housing 206 may be secured to the rack 102. For example, as described above the housing 206 may be secured to a spacing post 108 of a rack 102, e.g., with a housing hook 218 or other feature that allows for the housing 206 to be selectively secured to the rack 102. As described above, the spacing posts 108 of the rack 102 may be oriented to allow multiple fiber loop housings 206 to be hung from each of the spacing posts 108. Process 300 may then proceed to block 314.

In block 314, additional media 200 may be connected to a rack 102 already having a first media 200. For example, as shown in FIG. 1C, a media 200a may first be connected to the rack 102 with connectors 202a, 202a'. Additional media 200b, 200c may subsequently be secured to connectors 202b, 202b' and 202c, 202c', respectively. The multiple media 200 may overlap one or more other media 200 due to the relative proximity of components to which the media 200 are connected.

Proceeding to block 316, one or more housings 206 may be repositioned on the rack 102. Further, the housings 206 may be removed from the rack 102, repositioned elsewhere on the rack 102, or even on other racks 102 (not shown in FIG. 1C) despite any overlap of the media 200 that are connected to the rack 102. For example, referring specifically to FIG. 1C, media 200a may be initially connected to rack components via connectors 202a, 202a'. After media 200a is connected, media 200b and 200c are connected, thereby overlapping the media 200a at certain points on the rack 102 and hindering access to the media 200a. However, despite this overlap, the media 200a may be extended from or even removed free of the housing 206a, allowing the slack in the media 200a to be pulled to another position on the rack 102 where it is convenient to position the slack of the media 200a. The media 200a may also be disconnected entirely from the rack 102 to allow replacement, e.g., when the media 200a is damaged.

Repositioning and/or removal of the housings 206 from their associated media 200 may be convenient where it is necessary to gain access to media 200a after it has become damaged, and other media 200b, 200c overlap the media 200a. Instead of requiring each overlapping media 200b, 200c to be disconnected or removed to gain access to the damaged media 200a, a slack portion of the media 200a may be removed entirely from the housing 206a, thereby allowing the media 200a to be disconnected and replaced without requiring any repositioning of the overlapping media 200b, 200c. This may be especially convenient where a large number of media 200 are routed to a particular location on a rack and overlap a damaged media 200.

Alternatively, for example where only one or a small number of other media or fibers, e.g., media 200b, 200c, overlap a damaged fiber, e.g., media 200a, slack portions of the media 200b, 200c may themselves be repositioned on the rack 102 or even spaced away from the rack 102 to allow access to the damaged media 200a at least temporarily while the service/replacement of the damaged media 200a occurs. Accordingly, housings 206 may be repositioned while the media 200 associated with the housings 206 remain connected to the components with which they are associated. Process 300 may then terminate.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed is:

1. A media rack system, comprising:
    a rack which includes a plurality of components selectively connected via a plurality of communication media, wherein the rack comprises a plurality of bays and a plurality of posts;
    a media loop housing having a mounting mechanism and at least one media retention spool, the at least one retention spool including:
        a support surface selectively supporting one of the media; and
        a media loop retainer secured to the support surface, the media loop retainer including a predetermined radius selectively retaining a loop of the one of the communication media;
    wherein the predetermined radius is greater than or equal to a minimum bend radius associated with the one of the media;
    wherein the plurality of posts extend longitudinally between two adjacent bays;
    wherein the at least one media retention spool is hung from at least one of the plurality of posts and is vertically oriented, thereby facilitating organization of the communication media; and
    wherein the mounting mechanism includes a hook or loop that grips to said at least one of the plurality of posts;
    wherein the plurality of bays comprise a plurality of vertically oriented shelves wherein each of the shelves include one or more of said plurality of components.

2. The media rack system of claim 1, wherein the at least one spool is selectively rotatable to allow refraction and extension of the one of the media when the loop is retained by the media loop retainer.

3. The media rack system of claim 1, wherein the media loop retainer is configured to selectively retain a loop of the media anywhere along a length of the media.

4. The media rack system of claim 1, wherein the media loop retainer includes an abutment surface for selectively supporting the media.

5. The media rack system of claim 1, wherein the media loop retainer includes a cavity defined by the spool.

6. The media rack system of claim 1, wherein the media loop retainer extends adjacent to opposing outer edges of the spool, thereby guiding the media to the opposing outer edges of the spool.

7. The media rack system of claim 1, wherein the at least one spool defines a spool radius and a spool length, the spool radius being greater than or equal to the minimum bend radius associated with the one of the media, the spool length being at least twice the spool radius.

8. A media rack system, comprising:
a rack configured to receive a plurality of components selectively connected via a plurality of media, the rack including a plurality of bays and a plurality of posts;
a media loop housing having a mounting mechanism and at least one media retention spool, the media retention spool including:
 a support surface configured to selectively support one of the media;
 a media loop retainer secured to the support surface and generally defining a curved abutment surface for supporting the media, the media loop retainer including a predetermined radius for selectively retaining a loop of one of the media anywhere along a length of the media;
 wherein the spool is selectively rotatable to allow retraction and extension of one of the media when the loop is retained by the media loop retainer;
 wherein the media loop retainer includes a cavity defined by the spool and extends adjacent to opposing outer edges of the spool, thereby guiding the media to the opposing outer edges of the spool;
 wherein the spool defines a spool radius and a spool length, the spool radius being greater than or equal to a minimum bend radius associated with the one of the media, the spool length being at least twice the spool radius; and
 wherein the predetermined radius is greater than or equal to the minimum bend radius associated with the one of the media;
 wherein at least one of the plurality of posts extends longitudinally between two adjacent bays;
 wherein the at least one media retention spool is hung from said at least one of the plurality of posts and is vertically oriented, thereby facilitating organization of the communication media; and
 wherein the mounting mechanism includes a hook or loop configured to attach to said at least one of the plurality of posts;
 wherein the plurality of bays comprise a plurality of vertically oriented shelves, wherein each of the shelves are adapted to store one or more of said plurality of components.

9. The media rack system of claim 1, wherein the media loop housing is configured to extend away from at least one of the posts.

10. The media rack system of claim 1, wherein the media loop housing is configured to extend in a direction generally perpendicular to at least one of the posts.

11. The media rack system of claim 1, wherein the mounting mechanism is configured to selectively attach to at least one of the posts.

12. The media rack system of claim 4, wherein the abutment surface is at least partially defined by a cavity.

13. The media rack system of claim 1, wherein said at least one of the plurality of posts extends a shorter distance along the length of the media rack system than each of the bays.

14. The media rack system of claim 8, wherein said at least one of the plurality of posts extends a shorter distance along the length of the media rack system than each of the bays.

* * * * *